Nov. 17, 1964 C. A. CRAFTS 3,157,740

TRANSMITTER AND RECEIVER FOR PHASE MODULATED SIGNALS OF THE RELATIVE PHASE SHIFT TYPE

Filed Nov. 17, 1960 7 Sheets-Sheet 1

Nov. 17, 1964 C. A. CRAFTS 3,157,740

TRANSMITTER AND RECEIVER FOR PHASE MODULATED SIGNALS OF THE RELATIVE PHASE SHIFT TYPE

Filed Nov. 17, 1960 7 Sheets-Sheet 6

United States Patent Office 3,157,740
Patented Nov. 17, 1964

3,157,740

TRANSMITTER AND RECEIVER FOR PHASE MODULATED SIGNALS OF THE RELATIVE PHASE SHIFT TYPE

Cecil A. Crafts, Santa Ana, Calif., assignor to Robertshaw Controls Company, a corporation of Delaware
Filed Nov. 17, 1960, Ser. No. 69,878
17 Claims. (Cl. 178—66)

The invention presented herein relates in general to a communication system and in particular to a communication system using phase shift keyed signals in which the intelligence to be transmitted is represented by the difference in phase between a phase portion produced in response to an information signal and the preceding phase portion.

It is an object of this invention to utilize a logic circuit for encoding the input signals in terms of a change in phase measured in a given direction between the phase produced by a given input signal and the preceding phase.

It is another object of this invention to utilize a logic circuit for demodulating the phase shift keyed signal.

A further object of this invention is to provide for the transmission of intelligence by a phase shift keyed signal in which an ambiguous output condition is rapidly and automatically corrected.

Another object is to develop the signal inputs to the logic circuit at the receiver through the use of a signal developed from the phase shift keyed signal permitting a reduction in band width and power requirements, as well as system complexity.

Still another object is to use a logic circuit as the receiver which eliminates the need for developing an absolute phase reference signal with reference to the received phase shift keyed signal in order to obtain the proper output signals.

A still further object is to provide a system which imposes no limitation in the duration of any one phase representing an input signal making it possible to accommodate pulse width modulation (PWM) and pulse position modulation (PPM) as well as phase code modulation (PCM).

The invention is illustrated in connection with the transmission of binary signals such as the "mark" and "space" signals supplied by a teletypewriter and the transmission of two binary input signals such as may be obtained from the output of two or more of the synchronously operated teletypewriter signal generators. Thus, in the case of two synchronously operated teletypewriter signal generators, four possible signals are formed as determined by the four possible combinations of the "mark" and "space" signals supplied by one teletypewriter signal generator and the "mark" and "space" signals supplied by another teletypewriter signal generator.

For a better understanding of the present invention, together with other and further objects thereof, reference is had to the following description taken in connection with the accompanying drawings wherein.

Figure 1:
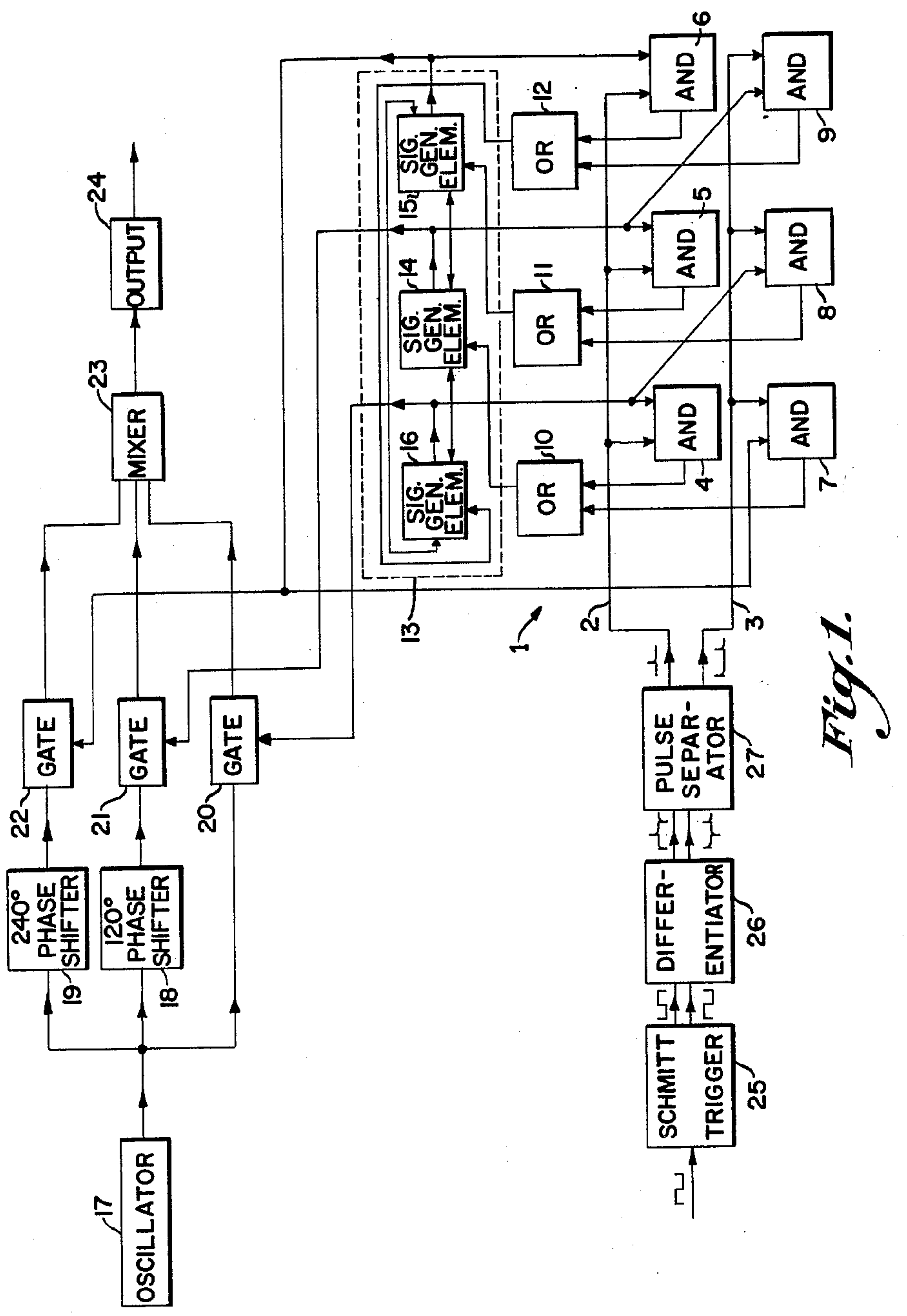
FIG. 1 is a block diagram of circuitry for phase shift modulation of a signal in response to two different input signals in accordance with the present invention.

Referring now to FIG. 1 of the drawings, there is shown circuitry in block diagram form in accordance with this invention for developing a phase shift keyed signal for transmitting information having different phase portions in which the difference in phase between a given phase portion and the preceding phase portion is either one of two values when the phase difference is measured from the preceding phase portion in a given direction. The circuitry includes the logic circuit shown generally at 1. Provision is made for receiving signals from two sources. Means for receiving a first signal is indicated by line 2 and means for receiving a second signal is indicated by line 3. The signals, for example, may be developed from a binary input such as the "mark" and "space" signals of a teletypewriter transmitter, and therefore, are not applied simultaneously. Thus, the signal applied to line 2 may be representative of a "mark" and the signal applied to line 3 may be representative of a "space" or vice versa. It will be apparent as the description proceeds that the time length of the input signals from which the input signals to logic circuit 1 are obtained may vary.

The logic circuit 1 includes a plurality of "and" gating circuits. An "and" gating circuit as used in this description refers to a circuit producing an output signal only when signals are present at two inputs. "And" circuits 4, 5, and 6 are each connected to line 2 for receiving a signal applied to line 2. "And" circuits 7, 8, and 9 are similarly connected to line 3 to receive signals applied to line 3. The logic circuit 1 also includes a plurality of "or" circuits. An "or" circuit as used in this description refers to a circuit which produces an output in response to a signal applied to any one or more of a plurality of input terminals. An "or" circuit 10 is connected to receive an input signal from the output of "and" circuits 4 and 7. An "or" circuit 11 is similarly connected to "and" circuits 5 and 8. An "or" circuit 12 is similarly connected to "and" circuits 6 and 9.

A storage signal generator, which includes the elements within the dotted line 13, may be considered a part of the logic circuit 1. It provides three signal generating elements 14, 15, and 16 connected to the output of "or" circuits 10, 11, and 12, respectively. A given signal generating element is turned on when it receives a signal from the output of its respective "or" circuit. The signal generating elements are interconnected so that a given signal generating element when turned on is effective to turn off the signal generating element that was on. Thus, only one signal generating element is on at any one time. A signal from any one of the "or" circuits 10, 11, and 12 will cause its respective signal generating element to be turned on and, whichever one has been on, will be turned off.

The output of signal generating element 14 is connected to the second inputs of "and" circuits 5 and 9. Similarly, the output of signal generating element 15 is applied to "and" circuits 6 and 7, while the output of gating signal generating element 16 is applied to "and" circuits 4 and 8. The output of each of the signal generating elements 14, 15, and 16 is also the output for the logic circuit 1, if the storage signal generator 13 is considered as a part of the logic circuit.

A source of a plurality of signals, each of a given frequency and differing only in phase which can be individually selected in accordance with the output of the logic circuit 1 and applied to an output circuit to form a phase shift keyed signal, is provided by the oscillator 17, two phase shifters 18 and 19, three gating circuits 20, 21, and 22, mixer circuit 23, and an output circuit 24. The output of oscillator 17 is a signal of a given frequency which is applied directly as one input signal of gating circuit 20 and to gating circuits 21 and 22 via phase shifters 18, 19, respectively. The phase shifter 19 is used to shift the output of oscillator 17 240°, while phase shifter 18 is used to shift the output of oscillator 17 120°. The gating circuits 20, 21, and 22 thus stand ready to pass a signal of 0°, 120°, and 240°, in reference to the output of oscillator 17 whenever a second signal is applied to a particular gating circuit. Gating circuits 20, 21, and 22 are connected to receive a second input signal from the output of the signal generating elements 16, 14, and 15, respectively, of the logic circuit 1. The output of each of the gating circuits 20, 21, and 22 are applied to mixer circuit 23 which in turn is applied to output circuit 24. The output of circuit 24 is then applied to the particular communication link to be used, such as wire or radio.

The operation of the logic circuit 1 and the circuit connected to the output of the logic circuit will now be described. When the circuitry shown in FIG. 1 is placed in operation, any one of the three signal generating elements 14, 15, and 16 may be on. Assume it is signal generating element 16. The output of signal generating element 16 then provides the necessary signal to gating circuit 20 to cause the output circuit 24 to have an output signal equal to the frequency of oscillator 17 and of the same phase as the output of oscillator 17. An input signal is also present at "and" circuits 4 and 8 by the output of signal generating element 16. Assume now, that a signal is applied to line 2. This signal will then provide the second input signal for "and" circuit 4 causing "and" circuit 4 to have an output which is applied to signal generating element 14 via "or" circuit 10. The signal from "or" circuit 10 causes signal generating element 14 to be turned on which in turn causes signal generating element 16 to be turned off, thus, terminating the signal applied to gating circuit 20 and the input signal to "and" circuits 4 and 8 from signal generating element 16. The output of signal generating element 14 is applied to gate 21, which with the output of phase shifter 18 applied to gate 21, causes a signal to appear at the output of circuit 24 via mixer circuit 23 which is shifted 120° with respect to the previous signal portion appearing at the output of circuit 24.

Signal generating element 14, in addition to providing a gating signal to gating circuit 21, is also supplying one of the input signals for "and" circuits 5 and 9. The next signal to be applied to logic circuit 1 will appear at line 3 to supply a second input signal to "and" circuit 9. "And" circuit 9 then has an output signal which is applied to signal generating element 16 via "or" circuit 12 causing signal generating element 16 to be turned on which in turn causes signal generating element 14 to be turned off terminating the signal applied to gating circuit 21 and the inputs to "and" circuits 5 and 9 from signal generator 14. The output of signal generating element 16 applied to gating circuit 20 causes the output of circuit 24 to be a signal of 0° phase. The previous signal portion appearing at the output of output circuit 24 had a phase of 120°. Thus, the phase shift between the previous signal and the signal resulting from an application of a signal to line 3 of logic circuit 1 is 240°.

With signal generating element 16 turned on, "and" circuits 4 and 8 are provided with a signal input from signal generating element 16. The next signal to be applied appears at line 2, causing "and" circuit 4 to apply an output to signal generating element 14 via "or" circuit 10, which, as described before, turns on signal generating element 14 and causes the operation of signal generating element 16 to terminate. With signal generating element 14 turned on, the output of the output circuit 24 is a signal of 120° phase. The phase shift between the previous output signal and the output signal resulting from an application of a signal to line 2 of the logic circuit 1 is then 120°.

It can be seen from the operation of logic circuit 1 just discussed that signals applied to line 2 are identified by a phase change of 120° in the phase shift keyed signal produced at the output of output circuit 24 as measured in one direction with respect to the phase of the previous signal portion of the phase shift keyed signal and signals applied to line 3 are identified by a phase change of 240°. This relationship holds true regardless of which of the signal generating elements 14, 15, and 16 is initially turned on and the line to receive the first signal. The phase relationship of the various portions of the phase shift keyed signal with respect to the output of oscillator 17 will change, however. Thus, the input to mixer circuit 23 may be from any two of the three gating circuits 20, 21, and 22. However, the signals applied to line 2 in each case cause a change in phase in the phase shift keyed signal with respect to the phase of the previous phase portion of the phase shift keyed signal of 120°, while signals applied to line 3 in each case are identified with a change in phase in the phase shift keyed signal of 240°. A phase shift keyed signal formed in the manner just described can, therefore, be used to convey information represented by the signals applied to the inputs to the logic circuit 1.

In FIG. 1, the signal applied to line 2 may be due to a "mark" condition produced by a teletypewriter signal generator and signals applied to line 3 may be due to a "space" conditon produced by a teletypewriter generator or vice versa. This can be accomplished by the use of the circuitry shown connected to line 2 and line 3 of the logic circuit 1. This circuitry includes a Schmitt trigger circuit 25, a differentiator circuit 26, and a pulse separator circuit 27. The Schmitt trigger circuit 25 is conventional and its operation is well known. Waveforms representative of the input and output signals for these circuits are shown in FIG. 1 adjacent the blocks representing these circuits. When a "mark"-"space" signal is applied to the Schmitt trigger circuit 25, two output signals are obtained for each "mark" or "space" input. One of the output signals from Schmitt trigger circuit 25 has the same configuration as the input to the Schmitt trigger circuit 25, while the other output signal from circuit 25 is 180° out of phase with the input signal. The output signals are available at the plates of the two vacuum tubes used in a conventional Schmitt trigger circuit. The signals from the Schmitt trigger circuit 25 are applied to the differentiator circuit 26, which may be two conventional R–C differentiator circuits providing the output signals from differentiator 26 shown in FIG. 1. The output signals of differentiator 26 are applied to a pulse separator 27 which, for example, may take the form of two conventional parallel diode clipper circuits. The diodes in the parallel diode clipper circuits are poled so that the negative going pulses present in the signal applied to a particular clipper circuit will be removed to produce positive going pulses at each output of pulse shaper 27 in FIG. 1.

As indicated by the waveforms shown in FIG. 1, the output of pulse separator 27 connected to line 2 of the logic circuit 1 consists of pulses corresponding to "mark" to "space" transitions in input signal to the Schmitt trigger circuit 25. Similarly, the output of pulse separator 27 connected to line 3 of logic circuit 1 consists of pulses corresponding to "space" to "mark" transitions in the input signal to the Schmitt trigger circuit. Thus, the input pulses to line 2 are indicative of a "space" signal condition, while the input pulses to line 3 are indicative of a "mark" signal condition.

Figure 2:
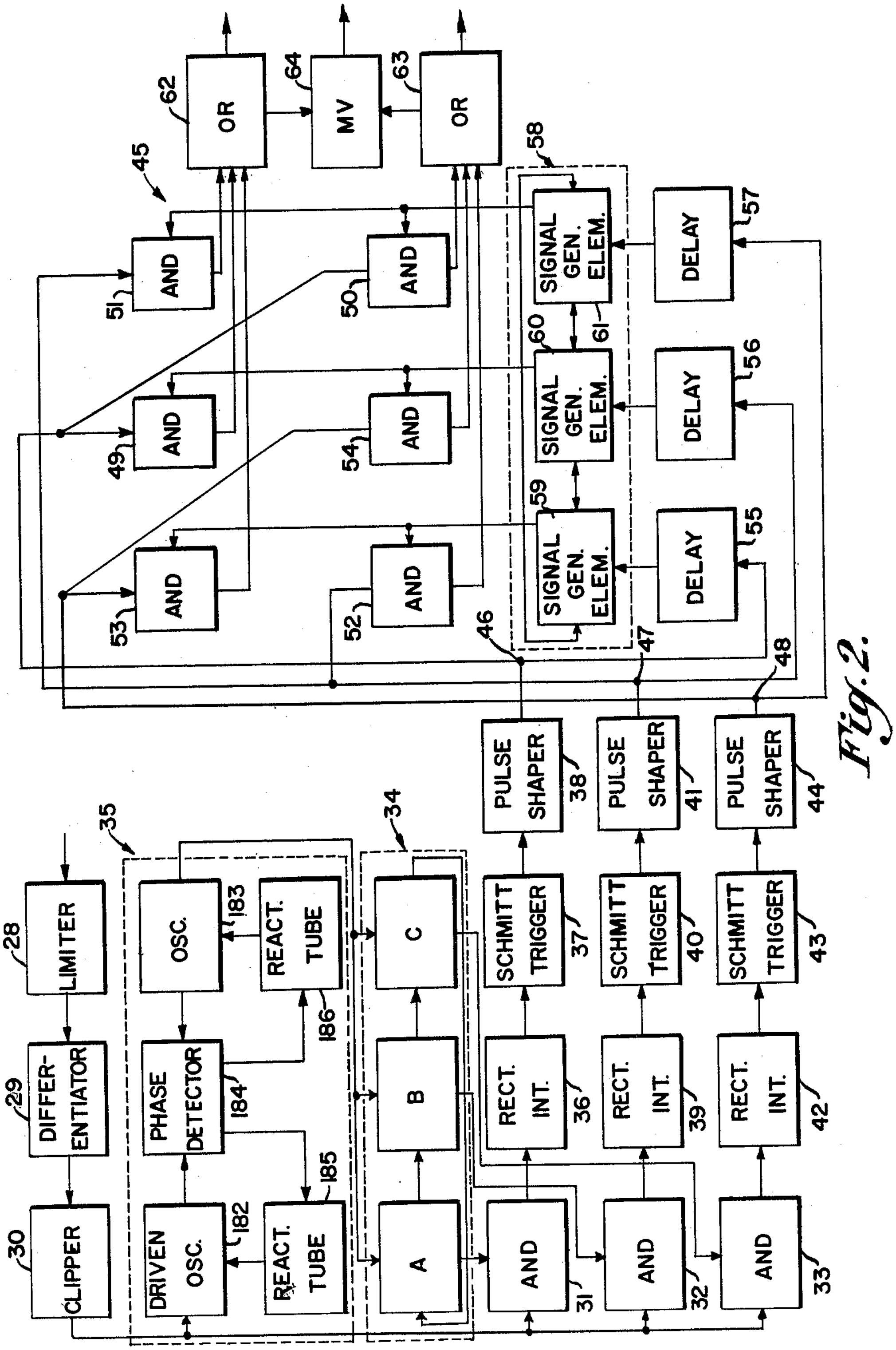
FIG. 2 is a block diagram of circuitry for demodulation of phase shift keyed signals in accordance with the present invention.

FIG. 2 shows circuitry in function block diagram form for demodulating a phase shift keyed signal in which the information to be conveyed is represented by the difference in phase between adjacent phase portions measured in a given direction from the preceding phase portion and specifically illustrates circuitry for demodulating a phase shift keyed signal such as that produced by the circuitry shown in FIG. 1.

The circuitry shown includes a limiting circuit 28 to which the received phase shift keyed signal is applied to form a square wave signal. The limiting circuit 28 may be a conventional parallel diode type. The square wave output from the limiter 28 is applied to a differentiator 29, which differentiates the square wave to form positive going pulses corresponding to negative to positive polarity transitions in the square wave and negative going pulses corresponding to the positive to negative polarity transitions in the square wave. The differentiator 29, for example, may include a plurality of conventional R–C differentiating circuits, one for each phase that may be contained in the phase shift keyed signal. For the circuit of FIG. 2, the differentiator 29 would include three R–C differentiating circuits since the phase shift keyed signal to be aplied to the limiter 28 may have phase portions of 0°, 120°, or 240°.

Since the received phase shift keyed signal is of the type developed by the circuitry of FIG. 1, which may consist of portions that are any two of three possible phases, 0°, 120°, or 240°, the negative going pulses and the positive going pulses appearing at the output of the differentiating circuit 29 occur at regular intervals with the pulses of a given phase portion either leading or lagging the pulses of the other phase portion by 120°. Therefore, either the negative going pulses or the positive going pulses can be used to synchronize the operation of an oscillator tuned to three times the frequency of the phase shift keyed signal.

The output of the differentiator 29 is applied to a clipper circuit 30 for removing either the negative or positive going pulses. The clipper circuit 30 may, for example, be three conventional parallel diode clippers, each connected to a different one of the R–C differentiator circuits of the differentiator 29.

The output of the clipping circuit 30 is applied to "and" gating circuits 31, 32, and 33 as an input signal for the "and" circuits. Thus, an "and" circuit is provided for each phase that may be contained in the received phase shift keyed signal. Each of the "and" circuits 31, 32, and 33 is connected to a different one of the parallel diode clippers of clipper circuit 30.

A gating signal generator is indicated at 34 which provides the second input signal for "and" circuits 31, 32, and 33. The gating signal generator 34 is of a type that has three output circuits which are indicated by blocks A, B, and C. Only one of the output circuits A, B, and C provides a second input signal to the "and" circuits 31, 32, and 33 at any given time. The duration of operation of circuits A, B, or C is controlled by an input signal which is applied to each of the output circuits A, B, and C. The output circuits are interconnected so that circuits A, B, and C are operated in sequence. An input signal to the gating signal generator is effective to turn on the next output circuit of the sequence and turn off the output circuit which was on. A ring counter type circuit will provide a gating signal generator having the characteristics described.

For the signal gating generator 34 shown, assume the sequence of operation is A, B, and then C. Thus, if the input signal to the signal generator 34 is applied at regular time intervals, the output of each of the output circuits will provide signals that are ⅓ of the time intervals in duration. Using the output of output circuit A as a reference, the output of output circuit B lags the output of output circuit A by ⅓ of the time interval, while the output of output circuit C lags the output of output circuit A by ⅔ of the time interval.

The input signal for the gating generator 34 is obtained from a signal generator 35 having an output signal with a frequency equal to three times the frequency of the phase shift keyed signal. The signal generator 35 is synchronized by the output pulses available at the output of clipping circuit 30. The output of clipping circuit 30 is shown applied directly to the signal generator 35.

The output of signal generator 35 is applied to the gating signal generator 34 so that one of the output circuits A, B, or C is turned on each time the output of the signal generator reaches a certain point in each cycle and the output circuit that was on is turned off. Thus, for every three cycles of the output signal of signal generator 35, the gating generator 34 completes its sequence. The point in each cycle of the output of the signal generator 35 at which the gating generator 34 is triggered is adjusted for optimum detection of the pulses present at the output of clipping circuit 30. The output of output circuits A, B, and C are shown connected to supply the second input for "and" circuits 31, 32, and 33, respectively.

For purposes of explaining the operation of the circuit of FIG. 2 described up to this point, assume a phase shift keyed signal is received that contains three different phase portions, for example, 0°, 120°, and 240°. The gating signal provided by the output circuit A of gating signal generator 34 may be in phase with the pulses from clipper circuit 30 corresponding to any one of the phase portions when the circuit is placed in operation. If the output of circuit A is in phase with the pulses derived from the 0° phase portions, the output of circuit B will be in phase with the pulses derived from the 120° phase portions and the output of circuit C will be in phase with the pulses derived from the 240° phase portions. As a result, any pulses present at the output of "and" circuit 31 will be those corresponding to the 0° phase portions. Similarly, any pulses present at the output of "and" circuits 32 and 33 will be those corresponding to the 120° and 240° phase portions, respectively. If the output of circuit A is in phase with the pulses derived from the 120° phase portions, the output of circuit B will be in phase with the pulses derived from the 240° phase portions and the output of circuit C will be in phase with the pulses derived from the 0° phase portions. Pulses present at the output of "and" circuits 31, 32, and 33 will then be those pulses derived from the 120°, 240°, and 0° phase portions, respectively. Similarly, if the output of circuit A is in phase with the pulses derived from the 240° phase portions, the pulses present at the output of "and" circuits 31, 32, and 33 will be those pulses derived from the 240°, 0°, and 120° phase portions, respectively. Thus, pulses derived from the various phase portions may appear at any one of the "and" circuits 31, 32, and 33 dependent on the initial phase relationship established between the gating signals supplied by the gating signal generator 34 and the phase shift keyed signal received.

The logic circuit used at the receiver makes it desirable that each phase portion be represented by a single pulse. The output of each of the "and" circuits is connected to separate pulse forming circuit. Thus, the output of "and" circuit 31 is applied to a rectifier-integrator circuit 36. The output of the rectifier-integrator circuit 36 is a single pulse which is used as the input signal to a conventional Schmitt trigger circuit 37. The rectifier-integrator circuit is conventional, using diodes for the rectifying action and a conventional R-C integrating circuit. The square wave output of the Schmitt trigger circuit 37 is applied to a pulse shaper circuit 38. The pulse shaper circuit 38 is used to develop a positive going pulse from the output of Schmitt trigger circuit 37. A suitable circuit for this purpose may, for example, include a conventional R-C differentiating circuit followed by a conventional parallel diode clipper circuit. Similar pulse forming circuits are connected to "and" gates 32 and 33. Thus, the circuit including rectifier-integrator circuit 39, Schmitt trigger circuit 40 and pulse shaper 41 and the circuit including rectifier-integrator 42, Schmitt trigger circuit 43, and pulse shaper circuit 44 are connected to "and" circuits 32 and 33, respectively.

The next major portion of the circuitry shown in FIG. 2 is the logic circuitry shown generally at 45. The logic circuit 45 has three input terminals 46, 47, and 48 connected to the output of pulse shapers 38, 41, and 44, respectively. The logic circuit 45 includes a plurality of "and" circuits. "And" circuits 49 and 50 are each connected to input terminal 46. "And" circuits 51 and 52 are connected to input terminal 47, while "and" circuits 53 and 54 are connected to input terminal 48.

The input terminals 46, 47, and 48 are also connected to delay circuits 55, 56, and 57, respectively. The delay circuits 55, 56, and 57 may be conventional multivibrator type delay circuits which are well known.

A storage signal generator, which includes the elements within the dotted line 58, may also be considered a part of the logic circuit 45 and is of the same type as the storage signal generator 13 of FIG. 1. It provides three signal generating elements 59, 60, and 61 which are connected to the output of delay circuits 55, 56, and 57, respectively. A given signal generating element is turned on when it receives a signal from the output of its respective delay circuit. The signal generating elements are interconnected so that a given signal generating element when turned on is effective to turn off the signal generating element that was on. Thus, only one signal generating element is on at any one time. A signal from any one of the delay circuits 55, 56, and 57 will cause the signal generating element receiving the signal to be turned on and whichever one has been on will be turned off.

The outputs of the signal generating elements 59, 60, and 61 are connected to the various "and" circuits of logic circuit 45 to provide the second input signal for the "and" circuits. Thus, the output of signal generating element 59 is connected to "and" circuits 52 and 53. The output of signal generating element 60 is connected to "and" circuits 49 and 54, while the output of signal generating element 61 is connected to "and" circuits 50 and 51.

The output of each of "and" circuits 49, 51, and 53 is connected to an "or" circuit 62, while the output of each "and" circuits 50, 52, and 54 is connected to an "or" circuit 63. The logic circuit 45 thus has two outputs, one from "or" circuit 62 and one from "or" circuit 63. The output terminals of the logic circuit 45 are connected to a conventional reset type multivibrator 64. The multivibrator 64 has one output level when it is triggered by an output from "or" circuit 62 and a different output level when triggered by an output from "or" circuit 63. The output of multivibrator 64 thus takes on the form of "mark-space" signals as determined by the output of logic circuit 45.

The phase shift keyed signals to be received by the circuit shown in FIG. 2 will, as previously indicated, consist of 0° and 120° phase portions, 120° and 240° phase portions or 0° and 240° phase portions. Assume, for purposes of explaining the operation of the logic circuit 45, that the received phase shift keyed signal includes only 0° and 240° phase portions. Assume further that output circuit A of gating signal generator 34 is in phase with the 0° phase portions. A pulse will then be applied at terminal 46 of logic circuit 45 whenever a 0° phase portion is received and a pulse will be applied at terminal 48 whenever a 240° phase portion is received.

Assume the last phase portion received was a 0° phase portion. This would result in a positive pulse being applied to delay circuit 55. It should be mentioned that the delay introduced by the delay circuits 55, 56, and 57 is great enough to cause the output circuit 64 to be operated by a pulse applied to the logic circuit before the pulse is reflected in the output of the delay circuit to which it is also applied to operate the storage signal generator 58. The pulse applied to delay circuit 55 is effective to turn on signal generating element 59 of the storage signal generator to prepare the logic circuit for receiving the next pulse. Signal generating element 59 provides "and" circuits 52 and 53 with an input signal when it is turned on. The next phase portion of the phase shift keyed signal will be due to a 240° change in phase from the previous phase portion and will result in a pulse being applied to the terminal 48 of logic circuit 45. This supplies "and" circuit 53 with a second input signal which then has an output signal that is applied to the output circuit 64 via "or" circuit 62 to cause output circuit 64 to have one output level in response to a 240° change in phase of the phase shift keyed signal.

The pulse appearing at terminal 48 is also applied to delay circuit 57 which is effective to turn on signal generating element 61 after the output circuit 64 has been operated by the pulse applied to terminal 48. When signal generating element 61 is turned on, signal generating element 59 is turned off. The input signal to "and" gates 52 and 53 from the signal generator 59 is thus terminated. "And" circuits 50 and 51 are supplied with an input signal from signal generating element 61 to place "and" circuits 50 and 51 in readiness for the next signal input to logic circuit 45. The next phase portion of the phase shift keyed signal will be a 0° phase portion which will represent a 120° change in phase from the previous phase portion and will result in a pulse being supplied to terminal 46. A pulse at terminal 46 is applied to "and" circuit 50 to supply the second input signal at the "and" gate. The pulse applied to terminal 46 is thus passed by "and" gate 50 to cause the output circuit 64 to be shifted to its other output level via "or" circuit 63.

The pulse appearing at terminal 46 causes signal generating element 59 to be turned on after a short delay caused by delay circuit 55. Signal generating element 61 is, of course, then turned off and the input signal for "and" gates 50 and 51 is terminated. "And" gates 52 and 53 are supplied with an input signal from signal generating element 59 when it is turned on. The next phase portion of the phase shift keyed signal will be 240° or is representative of a 240° change in phase from the previous pase portion. This results in a pulse being applied to terminal 48 which is passed to the output circuit 64 via "and" circuit 53 and "or" gate 62 to cause the output of output circuit 64 to return to the level representative of a 240° change in phase in the phase shift keyed signal. Thus, an output from "or" circuit 62 is indicative of a phase change of 120° while an output from "or" circuit 63 is indicative of phase changes of 240°. The manner in which output of circuit 64 is connected is dependent on whether a 120° phase and a 240° phase change are to represent a "space" and "mark" signal, respectively, or a "mark" and "space" signal, respectively.

As has been indicated, when discussing the operation of the circuit preceding the logic circuit 45, it would be possible for "and" gate 32 to pass the pulses derived from the 0° phase portions and "and" gate 31 to pass pulses derived from the 240° phase portions and "and" gate 33 to pass the pulses derived from the 0° phase portions and "and" gate 32 to pass pulses derived from the 240° phase portions. The particular phase relationship established between the output circuits of gating signal generator 34 and the received phase shift keyed signal does not alter the output obtained from "or" circuits 62 and 63. Regardless of the phase relationship initially established, "or" circuit 62 will continue to pass pulses indicative of 240° phase changes and "or" circuit 63 will continue to pass pulses indicative of 120° phase changes.

In addition to being able to accommodate any of the possible signal combinations that might be applied to the input terminals 46, 47, and 48, as a result of the phase relationship initially set up between the gating signal supplied by gating signal generator 34 and the phase shift keyed signal, the logic circuit 45 is able to adjust to changes that occur as a result of the loss of an initial phase relationship between the gating signals applied by gating signal generator 34 and the phase shift keyed signal with a minimum of error being introduced.

Thus, assume that the phase shift keyed signal consists of only 0° and 240° phase portions and that the initial phase relationship established between the gating signal generator 34 and the phase shift keyed signal is such that "and" gate 31 is passing the pulses derived from the 0° phase portions and "and" gate 33 is passing the pulses derived from the 240° phase portions.

The operation of the logic circuit 45 is then as previously described with pulses applied to terminals 46 and 48 being representative of changes in phase of 120° and 240°, respectively. Assume signal generating element 61 is on due to a pulse applied to terminal 48. The next pulse is representative of a 120° change in phase in the phase shift keyed signal and will appear at terminal 46 so long as the initial phase relationship is retained. Assume, however, that the initial phase relationship is upset and a new phase relationship is established between the output of gating signal generator 34 and the phase shift keyed signal so that the next pulse appears at terminal 47 instead of terminal 46. The new phase relationship will then cause pulses representative of a 240° phase change to appear at terminal 46. With signal generating element 61 on, "and" circuits 50 and 51 are supplied with one input signal. The signal representative of a 120° change in phase applied to terminal 47 results in an output from "and" circuit 51 which is applied to the output circuit 64 via "or" circuit 62. An error is thus introduced in the output of logic circuit 45 as a result of the pulse applied to the logic circuit 45 following an upset in the phase relationship between the output of the gating signal generator 34 and the phase shift keyed signal since the pulse was representative of a 120° change in phase and should have appeared at the output of "or" circuit 63 instead of "or" circuit 62.

The pulse applied to terminal 47, of course, is effective to turn on signal generating element 60 via delay circuit 56 so that "and" circuits 49 and 54 are supplied with an input signal. Signal generating element 61 is turned off when signal generating element 60 is turned on terminating the input to "and" circuits 50 and 51 from signal generating element 61. The next pulse will be representative of a phase change of 240° and, therefore, appears at terminal 46. The pulse is passed by "and" circuit 49 and is applied to the output circuit 64 via "or" circuit 62. "Or" circuit 62 is supposed to pass the pulses representative of a 240° change in phase so the pulse applied to terminal 46 was correctly routed to the proper output of logic circuit 45. Until the phase relationship between gating signal generator 34 and the phase shift keyed signal is again upset, an input pulse representative of a 120° change in phase will result in an output at "or" circuit 63 and an input pulse representative of a 240° change in phase will result in an output at "or" circuit 62. Thus, only the one bit of information represented by the phase portion following the upset in the initial phase relationship established between the output of the gating signal generator 34 and the phase shift keyed signal is erroneously indicated at the output of logic circuit 45.

FIGS. 3, 4, 5, and 6 show circuitry in block diagram form for the transmission of information in accordance with this invention in which two synchronous signals in the form of binary inputs from a teletypewriter signal generator or similar equipment provide the information signals. For purposes of illustration, the two binary inputs will be described as being obtained from two teletypewriter signal generators (not shown), one for each of two channels. The teletypewriter signal generators are synchronously operated, i.e., the two generators are synchronized so that the transitions between the "mark" and "space" signals produced occur simultaneously at both generators. Four possible combinations of the "mark" and "space" signals of the two generators can occur at a given instant of time, i.e., $S_1S_2$, $M_1S_2$, $S_1M_2$, and $M_1M_2$. A separate pulse representative of each of these combinations is obtained by use of the circuitry shown in FIG. 3 for use as an input signal to the logic circuitry shown generally at 72 in FIG. 4.

The output of the teletypewriter signal generator for channel 1 is applied to a circuit indicated generally at 66. This circuit is like that portion of the circuitry shown in FIG. 1 including the Schmitt trigger circuit 25, differentiating circuit 26, and pulse shaper circuit 27 and operates in a similar manner. A similar circuit, indicated generally at 67, is connected to receive the output of the teletype signal generator for channel 2. Circuit 66 has two output terminals. The output at one of the terminals consists of positive pulses for each "space" to "mark" transition and the output at the other terminal consists of positive pulses for each "mark" to "space" transition in the channel 1 input signals. These outputs are indicated at the output terminals of circuit 66 as $M_1$ and $S_1$, respectively. Similarly, circuit 67 has two output terminals. The output of circuit 67 at one of the terminals consists of positive pulses for each "space" to "mark" transition and the output at the other terminal consists of positive pulses for each "mark" to "space" transition in the channel 2 input signals. These outputs are indicated at the output terminal of circuit 67 as $M_2$ and $S_2$, respectively.

Figure 3:
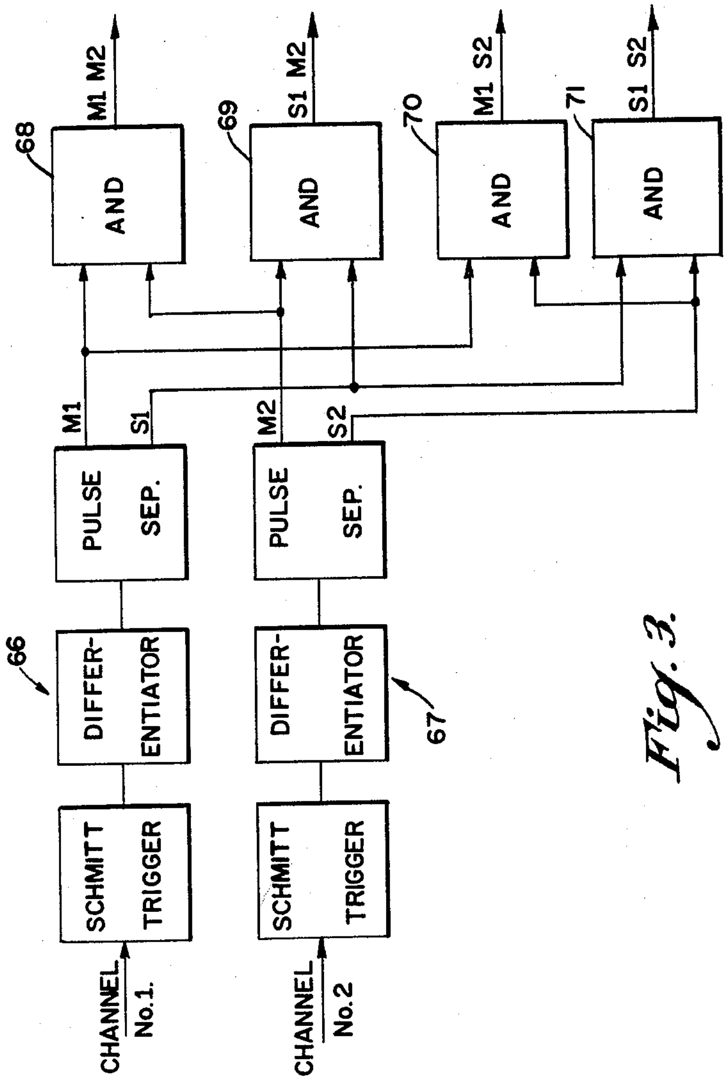
FIGS. 3 and 4 is a block diagram of circuitry for phase shift modulation of a signal in response to four different input signals in accordance with the present invention.

The circuitry shown in FIG. 3 also includes a plurality of "and" circuits 68, 69, 70, and 71 connected to the outputs of circuits 66 and 67. Thus, "and" circuit 68 is connected to receive the $M_1$ output of circuit 66 and the $M_2$ output of circuit 67. "And" circuit 69 is connected to receive the $S_1$ output of circuit 66 and the $M_2$ output of circuit 67. "And" circuit 70 is connected to receive the $M_1$ output of circuit 66 and the $S_2$ output of circuit 67. "And" circuit 71 is connected to receive the $S_1$ output of circuit 66 and the $S_2$ output of circuit 67.

An output pulse will be obtained from "and" circuit 68 each time the $M_1$ and $M_2$ outputs of circuits 66 and 67 occur simultaneously. The output of "and" circuit 68 is thus designated as $M_1M_2$. Similarly, the outputs of "and" circuits 69, 70, and 71 will be $S_1M_2$, $M_1S_2$, and $S_1S_2$, respectively, and are so designated.

Figure 4:
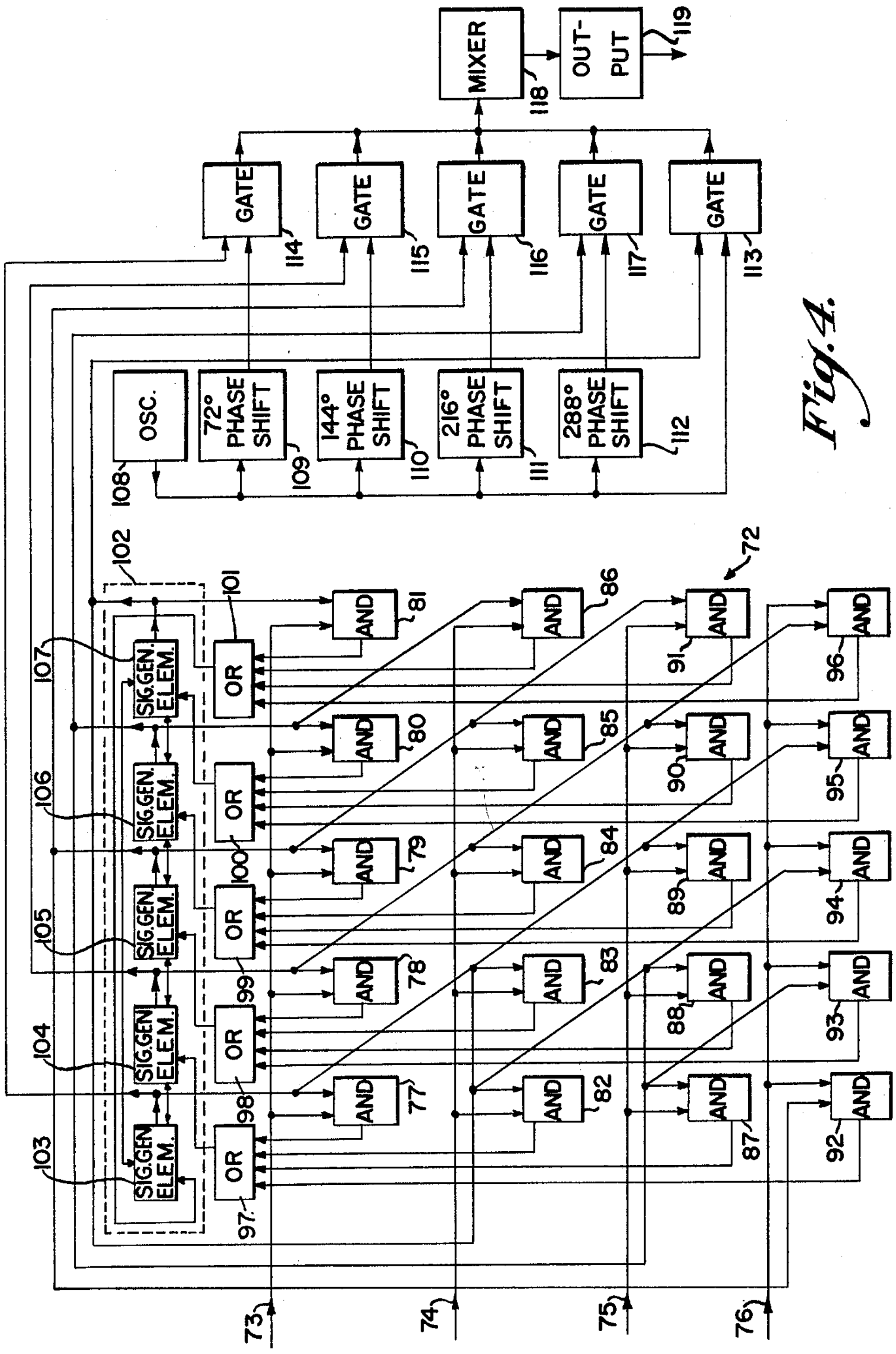

As in FIG. 1, the circuitry shown in FIG. 4 is used to develop a phase shift keyed signal in which the input or information signals are reflected in the phase shift keyed signal in terms of the change in phase measured in one direction between a phase portion produced in response to a given input signal and the preceding phase portion.

In this case, the four possible information signals available from the circuitry shown in FIG. 3 are used as the input signals to the logic circuitry indicated generally at 72. The logic circuitry is provided with at least four input terminals 73, 74, 75, and 76, for connection to the output of a different one of the "and" circuits of FIG. 3. It will be seen that an input signal applied to terminal 73 will cause the output signal of the circuitry shown in FIG. 4 to change by 72° when measured in one direction. Similarly, input signals to terminals 74, 75, and 76 will cause a change in phase of 144°, 216°, and 288°, respectively.

The logic circuitry 72 is merely an expansion of the logic circuitry of FIG. 1. As in FIG. 1, each input terminal is connected to a plurality of "and" circuits. Thus, terminal 73 is connected to one input terminal of "and" circuits 77, 78, 79, 80, and 81. A second group of "and" circuits 82, 83, 84, 85, and 86 is similarly connected to terminal 74. A third group of "and" circuits 87, 88, 89, 90, and 91 and a fourth group of "and" circuits 92, 93, 94, 95, and 96 are similarly connected to terminals 75 and 76, respectively.

A plurality of "or" circuits 97, 98, 99, 100, and 101, equal in number to the "and" circuits connected to a given input terminal, are each connected to the output of a different "and" circuit from each group of the "and"

circuits connected to the input terminals. Thus, a group of "and" circuits 77, 82, 87, and 92 have their output connected to "or" circuit 97. "And" circuits 78, 83, 88, and 93 form a group of "and" circuits that are similarly connected to "or" circuit 98. A similar group of "and" circuits including 79, 84, 89, and 94, another group including "and" circuits 80, 85, 90, and 95, and a fifth group including "and" circuits 81, 86, 91, and 96 are connected in a similar manner to "or" circuits 99, 100, and 101, respectively.

A storage signal generator, including the elements within dotted line 102, is the same type as storage signal generator 13 of FIG. 1, except that it has five signal generating elements instead of three. The operation, however, is the same and like storage signal generator 13, each of the signal generating elements 103, 104, 105, 106, and 107 is connected to supply the second input signal for a different "and" circuit in each of the groups of "and" circuits connected to the "or" circuits 97, 98, 99, 100, and 101. Thus, signal generating element 103 is connected to the second input terminal of "and" circuits 77, 83, 89, and 95. "And" circuits 78, 84, 90, and 96 are connected in a similar manner to signal generating element 104. "And" circuits 79, 85, 91, and 92 are connected in a similar manner to the signal generating element 105. Signal generating element 106 is connected to the second input terminal of "and" circuits 80, 86, 87, and 93. The remaining "and" circuits 81, 82, 88, and 94 have their second input terminals connected to signal generating element 107.

As in FIG. 1, the circuit of FIG. 4 includes a source of a plurality of signals, each of a given frequency and differing only in phase, which can be individually selected in accordance with the output of the logic circuit 72 and applied to an output circuit to form a phase shift keyed signal. The circuitry includes an oscillator 108, four phase shifters at 109, 110, 111, and 112, gating circuits 113, 114, 115, 116, and 117, a mixer circuit 118, and an output circuit 119. The output of oscillator 108 is a signal of a given frequency which is applied directly as one input signal for gating circuit 113 and to gating circuits 114, 115, 116, and 117 via phase shifters 109, 110, 111, and 112, respectively.

The phase shifters 109, 110, 111, and 112 are used to produce a phase shift in the output of oscillator 107 of 72°, 144°, 216°, and 288°, respectively. The gating circuits 113, 114, 115, 116, and 117 thus stand ready to pass a signal of 0°, 72°, 144°, 216°, or 288° in reference to the output of oscillator 108 whenever a second signal is applied to a particular gating circuit. Gating circuits 113, 114, 115, 116, and 117 are connected to receive a second input signal from the output of the signal generating elements 107, 103, 104, 105, and 106, respectively. The output of each of the gating circuits 113, 114, 115, 116, and 117 are applied to the mixer circuit 118 which in turn is applied to the output circuit 119. The output of circuit 119 is then applied to the particular communication link to be used, such as wire or radio.

The operation of the logic circuit 72 and the circuit connected to the output of the logic circuit is similar to the operation of the circuit shown in FIG. 1. By applying input signals to the input terminals 73, 74, 75, and 76 and assuming that any one of the signal generating elements 103, 104, 105, 106, and 107 is on, it can be seen that the input signals to terminals 73, 74, 75, and 76 cause a change in phase in the phase shift keyed signal produced at the output of output circuit 119, as measured in one direction with respect to the phase of the previous signal portion of the phase shift keyed signal, of 72°, 144°, 216°, and 288°, respectively. Thus, by connecting the output of "and" circuits 68, 69, 70, and 71 of FIG. 3 to the input terminals 73, 74, 75, and 76, respectively, the $M_1M_2$, $S_1M_2$, $M_1S_2$, and $S_1S_2$ information signals will be identified by changes in phase of the phase shift keyed signal of 72°, 144°, 216°, and 288°, respectively.

Unlike the circuit of FIG. 1, in which the phase shift keyed signal is made up of any two of the three possible phase conditions, the operation of the circuit of FIG. 4 is such that the phase shift keyed signal may contain all of the possible phase conditions when four input signals are applied to the logic circuit 72.

Figure 5:
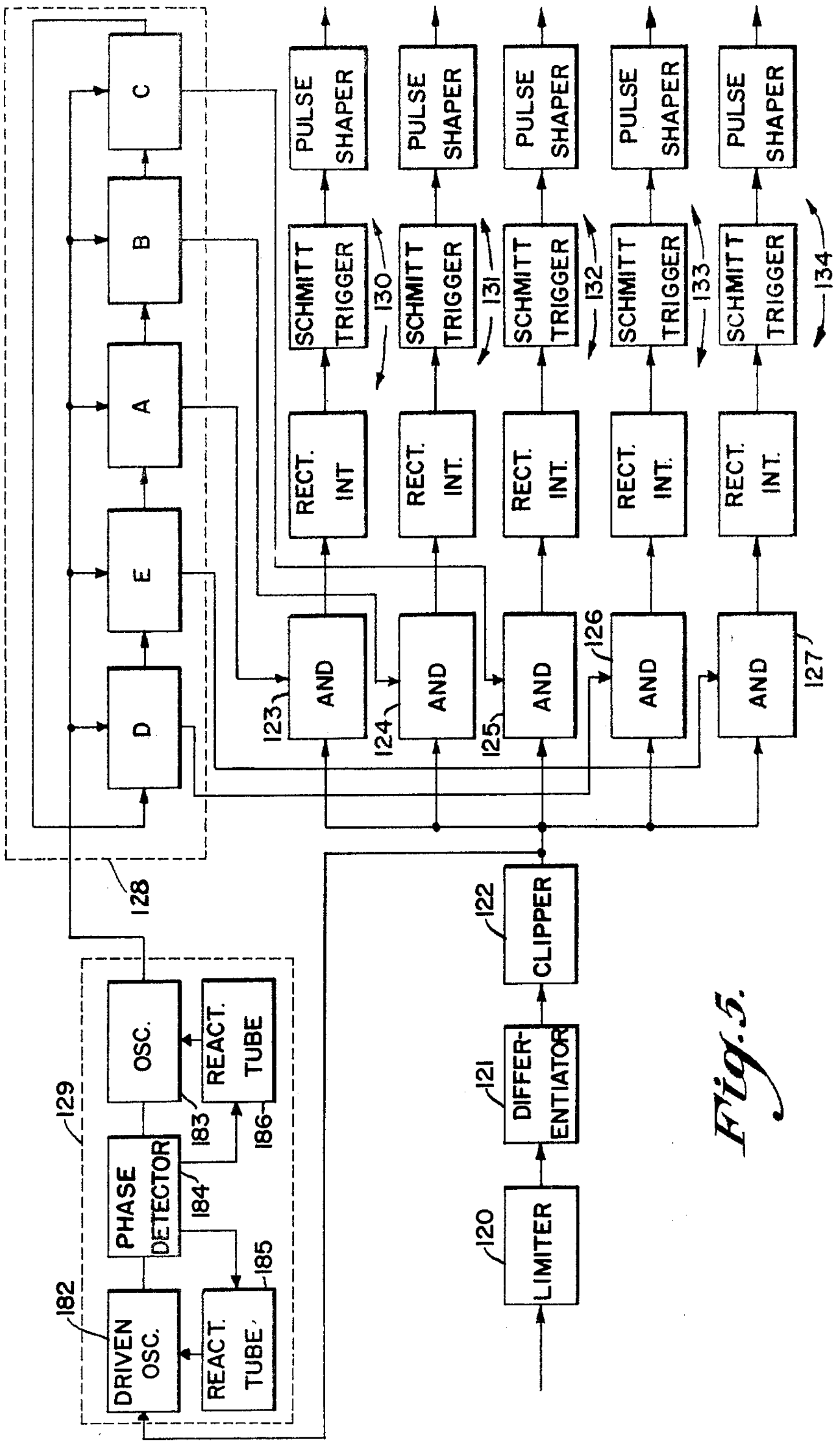
FIGS. 5 and 6 is a block diagram of receiver circuitry for demodulation of phase shift keyed signals in accordance with the present invention.
Figure 6:
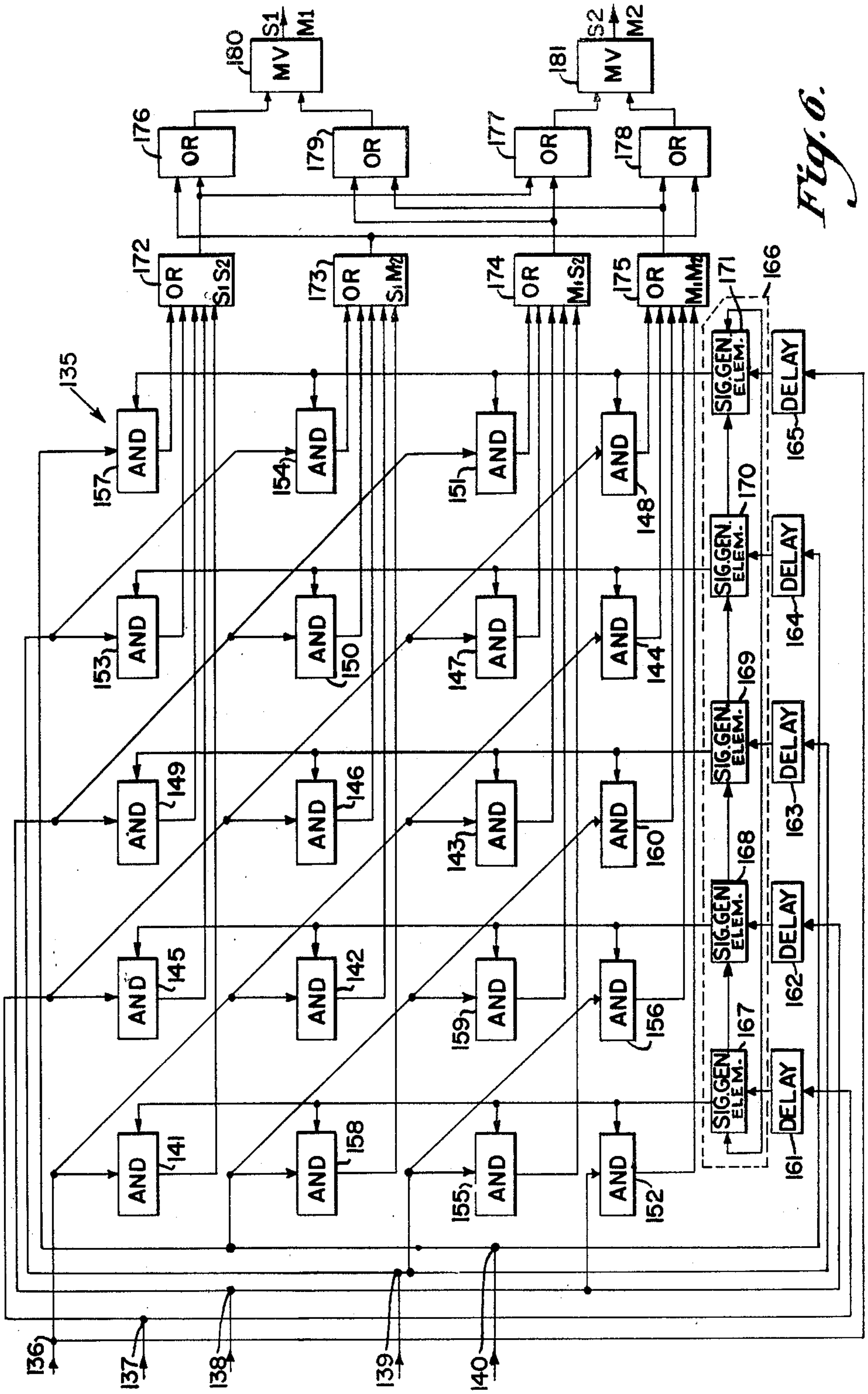

FIGS. 5 and 6 show circuitry in functional block diagram form for demodulating a phase shift keyed signal such as that produced by the circuitry of FIGS. 3 and 4 to reproduce the input signals applied to the circuitry of FIG. 3.

The circuitry of FIG. 5 includes a limiting circuit 120 to which the phase shift keyed signal is applied to form a square wave signal. The circuit is of the same type as limiting circuit 28 of FIG. 2. The square wave output from limitor 120 is applied to a differentiator 121, which differentiates the square wave to form positive going pulses corresponding to negative to positive polarity transitions in the square wave and negative going pulses corresponding to the positive to negative polarity transitions in the square wave. The differentiator 121 is similar to differentiator 29 of FIG. 2 and may consist of five conventional R–C differentiating circuits.

The output of differentiator 121 is applied to a clipper circuit 122 which is similar to clipper circuit 30 of FIG. 2 and may include five conventional parallel diode clippers, each connected to a different one of the R–C differentiating circuits of differentiator 121.

The output of the clipping circuit 122 is applied to "and" gating circuits 123, 124, 125, 126, and 127 to provide an input signal for the "and" circuits. Each of the "and" circuits is connected to a different one of the parallel diode clippers of clipper circuit 122.

A gating signal generator is indicated at 128 and provides the second input signal for "and" circuits 123, 124, 125, 126, and 127. The gating signal generator 128 is of the same type as gating signal generator 34 of FIG. 2, except that it has five output circuits which are designated by blocks A, B, C, D, and E. The input signal for the gating generator 128 is obtained from a signal generator 129 having an output signal with a frequency equal to five times the frequency of the phase shift keyed signal. The signal generator 129 is synchronized by the output pulses available at the output of clipping circuit 122. The output of clipping circuit 122 is shown applied directly to the signal generator 129.

The output of the signal generator 129 is applied to the gating signal generator 128 so that one of the output circuits A, B, C, D, or E is turned on each time the output of the signal generator reaches a certain point in each cycle and the output circuit that was on is turned off. The sequence of operation for the output circuits is A, B, C, D, and then E. Thus, for every five cycles of the output signal of signal generator 129, the gating generator 128 completes its sequence. The output circuits A, B, C, D, and E are shown connected to "and" circuits 123, 124, 125, 126, and 127, respectively.

The output of "and" circuit 123 is applied to a pulse forming circuit indicated generally at 130 which is like that portion of FIG. 2 including rectifier-integrator circuit 36, Schmidt trigger circuit 37, and pulse shaper circuit 38. Similar circuits indicated generally at 131, 132, 133, and 134 are connected to the output of "and" circuits 124, 125, 126, and 127, respectively.

The operation of the circuit shown in FIG. 5 is similar to the operation of the circuit preceding the logic circuit 45 shown in FIG. 2. The gating signal provided by the output circuit A of gating signal generator 128 may be in phase with the pulses from clipper circuit 122 produced from any one of the phase portions of a phase shift keyed signal such as that provided by the circuitry of FIGS. 3 and 4. The possible phase portions are 0°, 72°, 144°, 216°, and 288°. If the output of circuit A is in phase with pulses derived from the 0° phase portions, the output of circuit B will be in phase with the pulses derived from the 72° phase portions, the output of circuit C will be in phase with the pulses derived from the 144° phase portions, the output of circuit D will be in phase with the pulses derived from the 216° phase portions, and the output of circuit E will be in phase with the pulses derived from the 288° phase portions. As a result, a pulse present at the output of the circuit 130 will be representative of a 0° phase portion. Similarly, a pulse present at the output of circuits 131, 132, 133, and 134 will be representative of 72°, 144°, 216°, and 288° phase portions, respectively.

The particular phase portion that an output at circuit 130 represents is dependent on the initial phase relationship established between the gating signal supplied by the gating signal generator 128 and the phase shift keyed signal received. The same is true for circuits 131, 132, 133, and 134. The phase relationship just discussed is only one of five possible phase relationships that may exist when the circuit is initially placed in operation. The outputs of these circuits due to the various phase portions for each of the five possible phase relationships that may exist between the gating signals supplied by the gating signal generator 128 and the phase shift keyed signal received are listed below in tabular form:

*Possible Phase Relationships*

| Circuit | 1 | 2 | 3 | 4 | 5 |
|---|---|---|---|---|---|
| 130 degrees | 0 | 288 | 216 | 144 | 72 |
| 131 do | 72 | 0 | 288 | 216 | 144 |
| 132 do | 144 | 72 | 0 | 288 | 216 |
| 133 do | 216 | 144 | 72 | 0 | 288 |
| 134 do | 288 | 216 | 144 | 72 | 0 |

The logic circuitry indicated generally at 135 in FIG. 6 is connected to receive the output signals from the pulse forming circuits 130, 131, 132, 133, and 134 of FIG. 5. Thus, the logic circuit 135 has five input terminals 136, 137, 138, 139, and 140 which are connected to the output of pulse forming circuits 130, 131, 132, 133, and 134, respectively, of FIG. 5.

The logic circuit 135 is merely an expansion of the logic circuit 45 of FIG. 2 and includes a plurality of "and" circuits. Each input terminal is connected to one input of a plurality of "and" circuits. Thus, terminal 136 is connected to one input terminal of "and" circuits 141, 142, 143, and 144. A second group of "and" circuits 145, 146, 147, and 148 is similarly connected to the input terminal 137. A third group of "and" circuits 149, 150, 151, and 152, a fourth group of "and" circuits 153, 154, 155, and 156, and a fifth group of "and" circuits 157, 158, 159, and 160 are similarly connected to terminals 138, 139, and 140, respectively.

The input terminals 136, 137, 138, 139, and 140 are also connected to delay circuits 161, 162, 163, 164, and 165, respectively. The delay circuits are connected to a storage signal generator, which includes the elements within the dotted line 166. It is of the same type as the storage signal generator 58 of FIG. 2. It provides five signal generating elements 167, 168, 169, 170, and 171 which are connected to the output of delay circuits 161, 162, 163, 164, and 165, respectively. Each of the signal generating elements is connected to supply the second input signal for one of an equal number of the "and" circuits. Signal generating element 167 is connected to the second input terminal of "and" circuits 141, 152, 155, and 158. "And" circuits 142, 145, 156, and 159 are connected in a similar manner to signal generating element 168. Signal generating element 169 is connected to the second input terminal of "and" circuits 143, 146, 149, and 160. Signal generating element 170 is connected to the input terminal of "and" circuits 144, 147, 150, and 153. The remaining "and" circuits 148, 151, 154, and 157 have their second input terminals connected to signal generating element 171. It should be noted that each "and" circuit connected to a given signal generating element is receiving one input signal from a single output terminal via a delay circuit. The second input to each "and" circuit connected to a given signal generator is received from a different one of the remaining input terminals.

The logic circuit 135 has four outputs supplied by the "or" circuits 172, 173, 174, and 175. The output of "and" circuits 141, 145, 149, 153, and 157 is connected to the input of "or" circuit 172. "And" circuits 142, 146, 150, 154, and 158 are similarly connected to "or" circuit 173. The output of "and" circuits 143, 147, 151, 155, and 159 is connected to the input of "or" circuit 174. The output of "and" circuits 144, 148, 152, 156, and 160 is connected to the input of "or" circuit 175.

The circuitry shown in FIG. 6 described up to this point is connected to the circuit shown in FIG. 5. Its operation will, therefore, be described with reference to the output signals obtained from the circuit of FIG. 5. Referring to the earlier tabulation of the output of circuits 130, 131, 132, 133, and 134, assume that the phase relationship between the output of gating signal generator 127 and the received phase shift keyed signal is such that the output of circuit 130 is representative of a 0° phase portion. Now, assume that the previous phase portion was 144°, resulting in a signal being applied to input terminal 137. Signal generating element 167 of the storage signal generator 166 will then be turned on prior to the next input signal being applied to logic circuit 135. When signal generating element 167 is turned on, "and" circuits 141, 152, 155, and 158 are supplied with one input signal from signal generating element 167.

Assume the next input pulse appears at terminal 136. In view of the assumed phase relationship between the output of gating signal generator 127 and the received phase shift keyed signal, this means the phase of the portion of the received phase shift keyed signal giving rise to this input pulse was 0°. This represents a change in phase of 288° over the previous phase portion. "And" circuit 141 is thus supplied with a second input by the pulse appearing at terminal 136 so that an output signal appears at the output of "or" circuit 172 connected to "and" circuit 141.

The signal at input terminal 136 is also applied to delay circuit 165 which delays the application of the input signal to signal generating element 171 until after it has been passed by "or" circuit 172. Its application to signal generating element 171 causes signal generating element 171 to be turned on and causes signal generating element 167 to be turned off. "And" circuits 148, 151, 154, and 157 are now furnished with an input signal from signal generating element 171.

Assuming the next pulse appears at the input terminal 139, "and" circuit 154 will then be furnished with a second input so that an output signal appears at the output of "or" circuit 173. A pulse appearing at terminal 139 would be due to a phase portion of the received phase shift keyed signal having a phase portion of 216°. Since the previous phase portion had a phase of 0°, an output at "or" circuit 173 is representative of a phase change of 216°.

Assuming the next two input signals appear at terminals 136 and 137, output signals will be produced at "or" circuit 174 and "or" circuit 175, respectively, which are representative of phase changes of 144° and 72°, respectively.

Thus, "or" circuits 172, 173, 174, and 175 have outputs representative of phase changes in the received phase shift keyed signal of 288°, 216°, 144°, and 72°, respectively. These phase changes were chosen to define signals $S_1S_2$, $S_1M_2$, $M_1S_2$, and $M_1M_2$. The "or" circuits 172, 173, 174, and 175 are, therefore, indicated in FIG. 6 as passing signals $S_1S_2$, $S_1M_2$, $M_1S_2$, and $M_1M_2$, respectively.

In order to obtain outputs such as those used to create signals $S_1S_2$, $S_1M_2$, $M_1S_2$, and $M_1M_2$, at the transmitter, additional circuitry is required. This is provided by the "or" circuits 176, 177, 178, 179 and two conventional reset multivibrators 180 and 181. "Or" circuit 172 has its output connected to "or" circuits 176 and 177, while "or" circuit 173 has its output connected to "or" circuits 176 and 178. Similarly, "or" circuit 174 has its output applied to "or" circuits 177 and 179, while "or" circuit 175 has its output connected to "or" circuits 178 and 179.

The output of "or" circuit 176 and "or" circuit 179 are connected to reset multivibrator circuit 180. The output of "or" circuit 179 is connected to cause multivibrator circuit 180 to have an output level indicative of a "mark" signal while the output of "or" circuit 176 is connected to cause multivibrator circuit 180 to have an output level indicative of a "space" signal. The output of multivibrator 180 is, therefore, indicative of $S_1$, $M_1$ signals. Similarly, the output of "or" circuit 177 and "or" circuit 178 is connected to reset multivibrator circuit 181. The output of "or" circuit 178 is connected to cause multivibrator circuit 181 to have an output level indicative of a "mark" signal, while the output of "or" circuit 177 is connected to cause multivibrator circuit 181 to have an output level indicative of a "space" signal. The output of multivibrator 181 is, therefore, indicative of $S_2$, $M_2$ signals.

The signal generators indicated by numerals 35 and 129 in FIGS. 2 and 5, respectively, have been described very briefly as being tuned to provide a signal which has a frequency which is a multiple of the frequency of the received phase shift keyed signal. In each case, a synchronizing signal is obtained from the received phase shift keyed signal and applied to the signal generator. This is the basic function of the signal generators 35 and 129.

The signal generators 35 and 129 are similar in structure and differ only in that the signal generator 35 of FIG. 2 is tuned to provide an output signal having a frequency equal to three times the frequency of the received phase shift keyed signal, while the signal generator 129 of FIG. 5 is tuned to provide an output signal having a frequency equal to five times the frequency of the received phase shift keyed signal. Therefore, the same reference numerals are used in both figures to identify the various elements included in the signal generators.

Each of the signal generators 35 and 129 includes two oscillators, a driven oscillator 182 and an oscillator 183. Each of the two oscillators is tuned to the same frequency, which is a multiple of the frequency of the received phase shift keyed signal. The output of each of the oscillators 182 and 183 is applied to a conventional phase detector circuit 184 which provides a direct current output signal as a measure of the difference in phase between the output of the two oscillators. This direct current output signal is used to alter the frequency of each of the oscillator circuits 182 and 183. This is accomplished by applying the direct current output signal of the phase detector 184 to a reactance which varies in response to the applied direct current signal. Reactance tubes 185 and 186 provide the variable reactance for oscillators 182 and 183, respectively. The reactance tubes present a variable capacitive reactance in response to the output of phase detector 184 which is effective to alter the frequency of the oscillators 182 and 183.

Though there are a number of circuits which may be used to carry out the basic function of the signal generators 35 and 129, there are certain advantages which accrue through the use of the arrangement just described. First, the output signal supplied by oscillator 183 is more stable since the effect of circuit noise and transients is diminished. Second, the phase detector 184 connected to each of the oscillators 182 and 183 provides a means for using the phase differences developed between oscillators 182 and 183 due to any change in the repetition rate of the synchronizing pulses applied to oscillator 182 to provide automatic frequency control. Slight changes in the frequency of the phase shift keyed signal may occur during the transmission process which would be reflected by a change in the repetition rate of the synchronizing pulses for oscillator 182.

Figures 7, 8, 9:
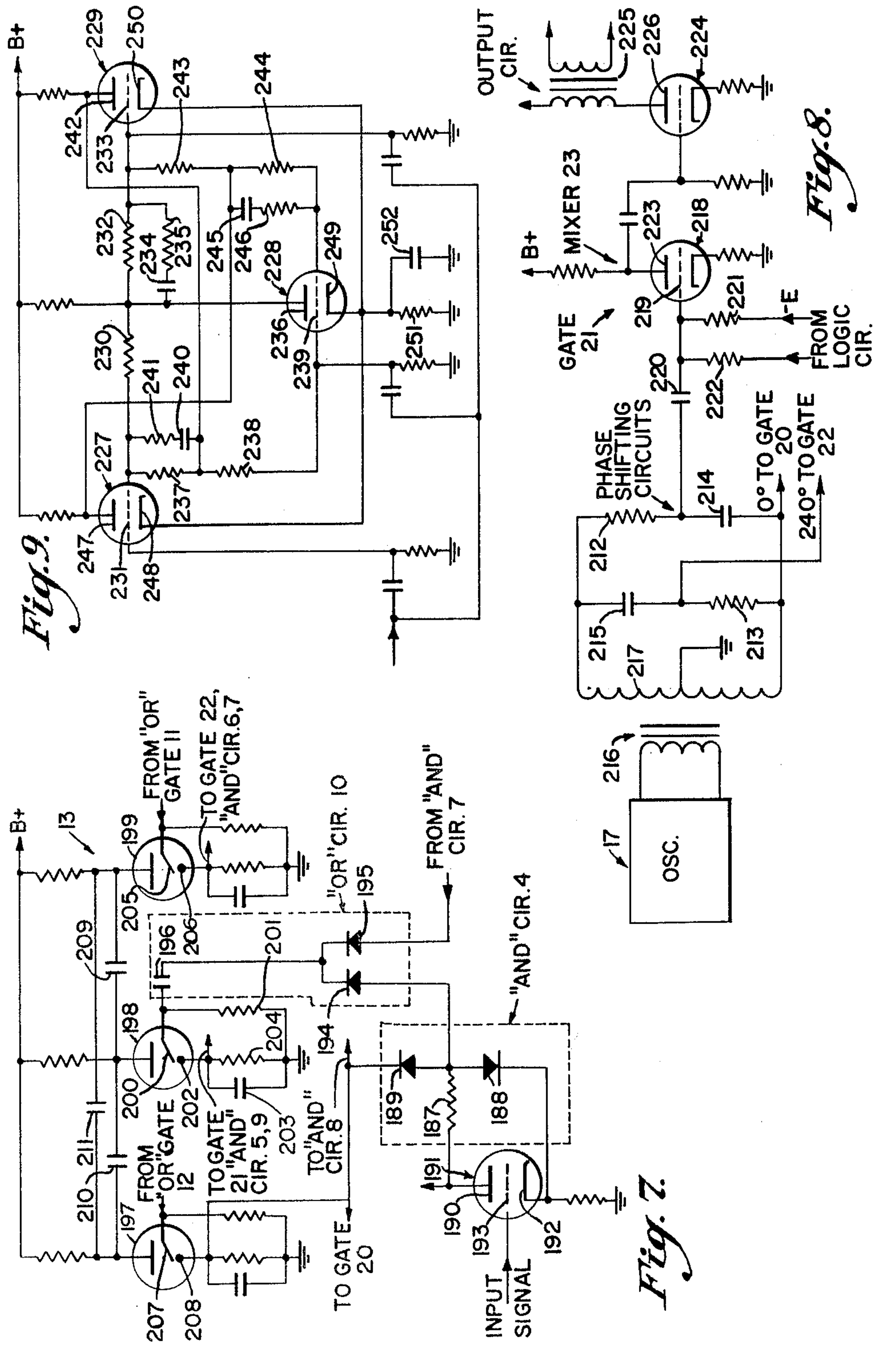
FIG. 7 illustrates an "and" circuit, an "or" circuit, and a storage signal generator circuit.
FIG. 8 illustrates a circuit for producing a phase shift keyed signal.
FIG. 9 illustrates a ring counter circuit.

FIG. 7 is a partial schematic of the logic circuit 1 of FIG. 1 and is used to illustrate circuits of the type which may be used as the "and" circuits, "or" circuits, and the storage signal generator circuits referred to in the description of the circuits shown in FIGS. 1–6. Thus, there is shown "and" circuit 4, "or" circuit 10, and storage signal generator 13 of FIG. 1.

"And" circuit 4 is conventional and includes resistor 187 and two diodes 188 and 189. The anodes of diodes 188 and 189 are each connected to the same end of resistor 187. The other end of resistor 187 is connected to the plate 190 of a triode vacuum tube 191. Tube 191 is connected as a conventional cathode follower. The cathode of diode 188 is connected to the cathode 192 of tube 191. An input signal applied to line 2 of logic circuit 1 appears at the grid 193 of tube 191.

"Or" circuit 10 is also conventional and includes two diodes 194 and 195 and a capacitor 196. The cathodes of diodes 194 and 195 are each connected to one side of capacitor 196 which has its other side connected to the storage signal generator 13. The anode of diode 194 is connected to the output of "and" circuit 4 which is at the connection common to diodes 188 and 189 and resistor 187. The anode of diode 195 is similarly connected to the output of "and" circuit 7.

A circuit usable as the storage signal generator 13 is shown in FIG. 7 and includes three cold cathode gas triodes 197, 198, and 199 which are connected to provide the signal generating elements of the storage signal generator. The trigger grid 200 of triode 198 is connected to the capacitor 196 of "or" circuit 10 and is also connected to ground via a resistor 201. The cathode 202 of triode 198 is connected to ground via parallel connected capacitor 203 and resistor 204. The output from triode 198 is taken from cathode 202 and is applied to gating circuit 21 and "and" circuits 5 and 9.

Triodes 197 and 199 are similarly connected. The trigger grid 205 of triode 199 receives a triggering signal from "or" circuit 11 and has its cathode 206 connected to supply gating circuit 22 and "and" circuits 6 and 7 with an input signal when it is conducting. The trigger grid 207 of triode 197 receives a triggering signal from "or" circuit 12 and has its cathode 208 connected to supply gating circuit 20 and "and" circuits 4 and 8 with an input signal when it is conducting. Cathode 208 is shown connected to the cathode of diode 189 of "and" circuit 8.

The plates of tubes 197, 198, and 199 are connected to the B+ voltage supplied via suitable load resistors. The plates of the various tubes are also interconnected via capacitors 209, 210, and 211. Thus, the plates of triodes 197 and 198 are connected via capacitor 210, while the plates of triodes 198 and 199 are connected together via capacitor 209 and the plates of triodes 197 and 199 are connected together via capacitor 211.

Operation of the circuit shown in FIG. 7 is as follows: Assume triode 197 is conducting. A first input signal is then applied to diode 189 of "and" circuit 4 and to gating circuit 20 from the cathode 208 of triode 197. An input signal applied to the grid 193 of triode 191 causes the triode 191 to conduct to provide "and" circuit 4 with a second input signal which is applied to diode 188 from cathode 192 of tube 191. The two input signals to "and" circuit 4 causes a pulse to pass via diode 194 of "or" circuit 10 which is applied to trigger grid 200 of triode 198 via capacitor 196 causing triode 198 to conduct. The negative pulse produced at the plate of triode 198 due to its conduction is coupled to the plate of triode 197 via capacitor 210. The potential across triode 197 is thus reduced below that necessary to keep it fired and it is extinguished. The potential at the cathode 202 of triode 198 then is used as the input signal for gating circuit 21 and "and" circuits 5 and 9. The triode 198 continues to conduct until a triggering signal is applied to the trigger grid of either triodes 197 or 198.

FIG. 8 is a partial schematic of the circuitry of FIG. 1 for producing a phase shift keyed signal in accordance with the output signals supplied by logic circuit 1 of FIG. 1 and is shown to illustrate circuit components for use in such circuitry. Where applicable, reference numerals corresponding to those used in FIG. 1 are used in FIG. 8 to identify the various sub-circuits.

The phase shifting circuits each include illustrative elements as resistors 212, 213, and capacitors 214, 215 which are coupled to the oscillator 17 via a transformer 216. The secondary winding 217 of transformer 216 is connected to ground at a point intermediate its ends. A 0° phase signal is obtained between the lower end of the secondary winding 217 and ground. Capacitor 215 and resistor 213 are connected in parallel with the secondary winding 217 with capacitor 215 connected to the upper end of secondary winding 217. The values of capacitor 215 and resistor 213 are such as to provide a signal between ground and the connection common to capacitor 215 and resistor 213 that has a phase of 240° with respect to the 0° phase signal obtained. Capacitor 214 and resistor 212 are connected in parallel with the secondary winding 217 with capacitor 214 connected to the lower end of secondary winding 217. The values of capacitor 214 and resistor 212 are such as to provide a signal between ground and the connection common to capacitor 214 and resistor 212 that has a phase of 120° with respect to the 0° phase signal obtained.

Only gating circuit 21 is shown in FIG. 8 and includes a triode-type vacuum tube 218. The grid 219 of tube 218 is connected to the 120° phase signal output via a coupling capacitor 220. The tube 218 is biased beyond cut-off by a negative voltage applied to the grid 219 via resistor 221. The grid 219 is also connected to the logic circuit 1 via a resistor 222. Resistor 222 is connected to signal generating element 14 as indicated in FIG. 1 to apply a signal to grid 219 when signal generating element 14 is made conductive. This signal is sufficient to overcome the negative bias applied to grid 219 via resistor 221, causing tube 218 to conduct to pass the 120° phase signal. The mixer circuit 23 is the plate circuit of the tubes used for the gating circuits 20, 21, and 22, which are connected to the output circuit 24. FIG. 8 illustrates how the signal at the plate 223 of tube 218 of gating circuit 21 is applied to the output circuit 24. The output circuit 24 illustrated includes a triode-type vacuum tube 224. The tube 224 is coupled to the plate 223 of tube 218 in a conventional manner to amplify the signal present at the plate 223 of tube 218. An output transformer 225 is connected in the plate circuit of tube 224 to couple the signal appearing at the plate 226 of tube 224 to the communication link to be used.

A ring counter circuit of the type usable as a gating signal generator circuit, such as is needed in the circuit shown in FIG. 2, is illustrated in FIG. 9. The ring counter illustrated includes three triode-type vacuum tubes 227, 228, and 229, only one of which conducts at any one time. The tubes are made conductive in sequence with a different one of the tubes conducting each time an input signal applied to the circuit reaches a particular value. Thus, tube 227 conducts after tube 228, followed by tube 229. The gating signals to be applied to the "and" circuits 31, 32, and 33 are obtained from the plates of tubes 227, 228, and 229.

The control elements of each of the tubes 227, 228, and 229 are interconnected. A resistor 230 connected to control element 231 of tube 227 and in series with resistor 232 connected to control element 233 of tube 229 provides the interconnection between control element 231 and control element 233. A capacitor 234 and a series connected resistor 235 are connected in parallel with resistor 232. The plate 236 of tube 228 is connected to the connection common to the resistor 230 and the resistor 232. Similarly, a resistor 237 is connected to control element 231 of tube 227 and in series with a resistor 238 connected to control element 239 of tube 228 provides the interconnection between the control elements of tubes 227 and 228. A capacitor 240 and a series connected resistor 241 are connected in parallel with resistor 237. The plate 242 of tube 229 is connected to the connection common to resistor 237 and resistor 238. A resistor 243 and a series connected resistor 244 provide the interconnection between control element 239 of tube 228 and control element 233 of tube 229. Resistor 244 is connected to control element 239, while resistor 243 is connected to control element 233. A capacitor 245 and a series connected resistor 246 are connected in parallel with resistor 244. The plate 247 of tube 227 is connected to the connection common to the resistors 243 and 244.

The cathodes 248, 249, and 250 of tubes 227, 228, and 229, respectively, are connected directly together and thence to ground via a resistor 251. A bypass capacitor 252 is connected in parallel with resistor 251.

Each of the control elements of tubes 227, 228, and 229 are resistance-capacitance coupled to an input signal source. The plates of tubes 227, 228 and 229 are connected to the plate voltage supply B+ in the usual manner.

Modification of this invention not described herein will become apparent to those of ordinary skill in the art. Therefore, it is intended that the matter contained in the foregoing description and drawings be interpreted as illustrative and not limitative, the scope of the invention being defined in the appended claims.

I claim:

1. In a communication system wherein information is transmitted on a single frequency carrier wave in the form of keyed shifts of phase each equal to $n\theta$ where $N\theta=360°$, N is an odd integer larger than 2, and $n$ is an integer from 1 to $N-1$, transmitter apparatus comprising
   - an oscillator operating at said frequency,
   - phase shifting means for altering the phase of said carrier wave in $n$ selectable multiples of $\theta$,
   - N gating circuits each connected for selective control of said phase shifting means,
   - means developing mark and space signals in separate circuit lines,
   - means responsive to a signal in one said line for selecting one value of $n\theta$ and operating a said gate circuit in response thereto, and
   - means responsive to a signal on another said line for selecting a different value of $n\theta$ and operating another said gate circuit in response thereto.

2. A transmitter for sending four distinct mark and space signals each as a different degree of keyed phase shift of a single frequency wave comprising
   - means generating a wave of single frequency,
   - means delaying said wave in phase steps progressively increasing by intervals of ⅕ cycle at five output points, respectively,
   - common output means including output gate means at each of said points for selecting output wave phases therefrom one at a time,
   - means including five ring gate signal elements biased for alternative operation in any order to provide output gating signals one at a time therefrom, said elements being connected respectively to said output gate means for selective operation thereof,
   - information signal input means including a source of pulses on each of four input lines corresponding to said mark and space signals, respectively,
   - matrix means connected by rows for response to said four input lines and by columns to provide input to said ring gate signal elements, including logic circuitry selectively operating said elements to provide said output gating signals in an order of produced output differing each from the preceding phase by a differing multiple of ⅕ cycle for each of said four input lines when actuated.

3. A transmitter for a single frequency carrier wave of N alternatively transmitted phase angles equally proportioned in a cycle thereof comprising
a transmitter output circuit,
a generator for said wave having N output connections each at a different one of said N phases,
gate means coupling one said output connection at a time to said output circuit and simultaneously disconnecting each other said connection therefrom,
individual signal means including $$\frac{N-1}{2}$$

sources of mark and space signals supplied alternatively in separate lines,
logic means selecting individual said signals and applying each signal to operate a particular said gate means to produce a phase shift in the carrier wave individual to said source and type of signal selected.

4. In a communication system employing for each channel a single frequency of carrier wave with information impressed thereon as magnitudes of phase shift in response to information bits, a transmitter comprising
an output circuit,
a signal generator operating to produce said wave,
means responsive to selection signals for altering the phase of said wave in integral multiples $$\frac{360°}{N}\cdot n$$

and applying the altered wave to said output circuit, where N is an odd integer and $n$ varies from 1 to $N-1$,
means applying $N-1$ input signals as separate pulses on a number of lines equal to the number of discrete magnitudes of phase shift to be transmitted, and
means including logic gating circuits for transforming said pulses on said lines into said selection signals differing according to said magnitudes, thereby to phase-modulate said carrier wave in coded magnitudes of phase shift.

5. In a communication system arranged to transmit $n$ differing information bits as $n$ differing degrees of phase shift each an integral multiple of $\theta$, where $N\theta=360°$, N is an odd integer greater than 2 and $n$ is $N-1$,
means generating and transmitting a single frequency wave,
means producing $n$ different signals each corresponding to one said bit,
means applying said produced signals one to each of $n$ groups of N gating circuits, thereby to bias for operation each of the N circuits of said groups,
N output gates connected for regular sequenced operation and including means cutting off each operated output gate when another said gate is operated,
means responsive to operation of each said output gate for applying one of said $n$ degrees of phase shift individual thereto as modulation of said wave, and
means altering the sequence of operation of said output gates to effect a different regular operating sequence individual to each of said $n$ signals, thereby to cause said $n$ degrees of phase shift modulation.

6. In a system for communicating digital information by phase shifting a carrier wave in $n$ increments of phase each an integral multiple of $\theta$ where $N\theta=360°$ and N is an integer larger than 2, said multiple varying from 1 to $n$ where $n=N-1$,
means generating a single frequency carrier wave,
means dividing said carrier wave into N like phase components each at an output terminal selectable for transmission of said wave component thereat,
means producing $n$ input signals in $n$ input channels each according to a different digital information bit, ring gate means of N steps connected for operation in ordered sequence one step at a time in response to one said input signal whenever it occurs,
means responsive to an input signal in the $n$th said channel for causing operation of said ring gate means $n$ steps at a time whenever it occurs,
means including N output gates connected, respectively, between said carrier wave dividing means and said output terminals confining output therefrom to one selected terminal at a time, and
means operating said output gates in an ordered sequence taken $n$ steps at a time in accordance with whichever of said $n$ input channels is instantly actuated.

7. In a system for communicating digital information by phase shifting a carrier wave in $N-1$ increments of phase each a simple multiple of $\theta$ where $N\theta=360°$ and N is an integer larger than 2, the improvement comprising
means generating a single frequency carrier wave,
means producing input signals on $N-1$ input channels each responsive to a differing information bit,
ring gate means operative in single steps in response to one said input signal and including N total steps each operative to exclude operation in the others,
means operating said ring gate means in single and multiple steps according to each different said input signal,
means producing from said carrier wave N phased waves at phase intervals of $\theta$, and
means selecting and applying at each of said outputs, respectively, one of said phased waves governed by operation of said gate means.

8. Apparatus for conveying mark and space signals by differing degrees of phase shift of a carrier wave comprising
means for generating a carrier wave of fixed frequency,
means for dividing said wave into portions at 0°, 120° and 240° relative phase,
generating three sequentially operative gating control signals in control of transmission of said phase portions, respectively, and
means for applying said mark and space signals one to shift said gating control signals by two steps of said sequential operation each time it occurs and the other to shift said gating control signals by one step of said sequential operation each time it occurs.

9. In a circuit for deriving information from a carrier signal phase shift keyed by intervals each an integral multiple of an odd number of equal intervals of phase relative to a cycle of carrier wave, means receiving said signal, means generating a voltage pulse of unitary sign, one for each multiple interval of shift of carrier phase, means responsive to said pulses generating a local oscillation of frequency equal to that of said carrier, means supplying in sequence a pulse to each of a number of outputs, a number of "and" circuits each connected to receive all of said voltage pulses and each to receive a different one of said sequenced pulses, means generating from the output of said "and" circuits a signal corresponding to each said number of keyed phase shifts received, logic circuit means responsive to said generated signals producing a resultant signal corresponding to each of said keyed intervals, and signal output means responsive to last said means generating a signal of magnitude corresponding to the interval of phase shift in each shift of phase of said carrier.

10. In a circuit responsive to a phase shift keyed signal with a given frequency having a number of possible discrete phase portions to produce an output dependent on the amount of change in phase between each phase portion and the preceding phase portion, the combination comprising: at least two groups of "and" circuits, each "and" circuit having an output and first and second inputs, each of said groups having an equal number of "and" circuits so that each "and" circuit of each group may be identified by a different symbol of a regular ordered sequence of symbols each representing a logic function; a plurality of circuits, one for each different symbol of said sequence of symbols, each connected for response to an "and" circuit of each group and each including an input terminal, a signal generating element having an input and output, a delay circuit having an input and an output, means connecting the output of said delay circuit to the input of said signal generating element and means connecting the input of said delay circuit to said input terminal; means interconnecting said signal generating elements so that only one of said signal generating elements is operating at any one time; means connecting the output of each of said signal generating elements to the first input of a different one of said "and" circuits in one of said two groups such that each signal generating element and its connected "and" circuit of said one group are identified by symbols of said sequence of symbols that are separated by a first predetermined number of symbols; means connecting the output of each of said signal generating elements to the first input of a different one of said "and" circuits in a second group of said groups such that each signal generating element and its connected "and" circuit of said second group are identified by symbols of said sequence of symbols that are separated by a second predetermined number of symbols; means connecting each of said input terminals to those "and" circuits of said groups of said "and" circuits which are identified by the same symbol as said last-mentioned input terminal; means responsive to said phase shift keyed signal to produce a signal for each different phase portion at a different one of said input terminals; means connected to each of said "and" circuits and responsive to the output of any "and" circuit of one of said two groups to produce one output signal condition and responsive to the output of any "and" circuit of the second of said two groups to produce a different output signal condition.

11. In a circuit responsive to a phase shift keyed signal of a given frequency having at least five differently phased portions to produce an output the pulse of which is dependent on the amount of change in phase between each phase portion and the preceding phase portion, the combination comprising: at least four groups of "and" circuits, each "and" circuit having an output and first and second inputs, each of said groups having an equal number of "and" circuits so that each "and" circuit of each group may be identified by a different symbol of a regular ordered sequence of symbols each representing a logic function; a plurality of circuits, one for each different symbol of said sequence of symbols, each connected for response to an "and" circuit of each group and each including an input terminal, a signal generating element having an input and output, a delay circuit having an input and output, means connecting the output of said delay circuit to the input of said signal generating element and means connecting the input of said delay circuit to said input terminal; means interconnecting said signal generating elements so that only one of said signal generating elements is operating at any one time; means connecting the output of each of said signal generating elements to the first input of a different one of said "and" circuits in one group of said four groups such that each signal generating element and its connected "and" circuit of said one group are identified by symbols of said sequence of symbols that are separated by a first predetermined number of symbols; means connecting the output of each of said signal generating elements to the first input of a different one of said "and" circuits in a second group of said four groups such that each signal generating element and its connected "and" circuit of said second group are identified by symbols of said sequence of symbols but are separated by a second predetermined number of symbols; means connecting the output of each of said signal generating elements to the first input of a different one of said "and" circuits in the third group of said four groups such that each signal generating element and its connected "and" circuit of said third group are identified by symbols of said sequence of symbols that are separated by a third predetermined number of symbols; means connecting the output of each of said signal generating elements to the first input of a different one of said "and" circuits in the fourth group of said four groups such that each signal generating element and its connected "and" circuit of said fourth group are identified by symbols of said sequence of symbols that are separated by a fourth predetermined number of symbols; means connecting each of said input terminals to those "and" circuits of said groups which are identified by the same symbol as said last-mentioned input terminal; means connected to each of said "and" circuits and responsive to the output of any "and" circuit of said first and second groups to produce one output and responsive to the output of any "and" circuit of the remaining groups of said four groups to produce a different output signal; and means connected to each of said "and" circuits and responsive to the output of any "and" circuit of said first group and one of said remaining groups to produce one output and responsive to the output of any "and" circuit of said second group and the other of said remaining groups to produce a different output signal.

12. A circuit for producing a phase shift keyed signal in a constant frequency carrier wherein information is in phase shifts of integral multiples of one-fifth cycle, including two synchronously operated sources of space and mark conditions each represented by a different one of said phase shifts, means connected to said sources having four output terminals and responsive to the four possible combinations of mark and space conditions produced by said sources to produce a signal for each of the four possible combinations of mark and space conditions at a different one of said four terminals; four groups of "and" circuits, each "and" circuit having an output and a first and second input; means connecting each of said output terminals to the first input of each "and" circuit of a different group of said groups; a plurality of logic circuits, each of which may be identified as a different logic step of a regular sequence of said steps, each including a different "and" circuit from each of said groups, a signal generating element having an input and output, means connecting said second input of each of said last-mentioned "and" circuits to the output of said signal generating element; means interconnecting said signal generating elements so that only one of said signal generating elements is operating at any one time; means connecting the input of each of said signal generating elements to the output of a different one of said "and" circuits in one group of said four groups so that each signal generating element and its connected "and" circuit of said one group are identified by logic steps of said sequence of steps that are separated by a predetermined number of steps; means connecting the input of each of said signal generating elements to the output of a different one of said "and" circuits in a second group of said groups such that each signal generating element and its connected "and" circuit are identified by logic steps of said sequence of steps that are separated by a second predetermined number of steps; means connecting the input of each of said signal generating elements to an output of a different one of said "and" circuits in a third group of said groups such that each signal generating element and its connected "and" circuit of said third group are identified by the logic steps of said sequence of steps that are separated by a third predetermined number of steps; means connecting the input of each of said signal generating elements to an output of a different one of said "and" circuits in the fourth group of said groups such that each signal generating element and its connected "and" circuit of said fourth group are identified by logic steps of said sequence of steps that are separated by a fourth predetermined number of steps; a source of at least five signals of a given frequency and differing by one-fifth cycle in phase; an output circuit; means connected to said signal source and the output of each of said signal generating elements and responsive thereto to connect a different one of said plurality of signals to said output circuit in response to the output of a different one of said signal generating elements, whereby four differing phase step outputs are generated, each representing one said multiple of one-fifth cycle.

13. A method of operating a phase shift transmitter comprising generating a single frequency divided into N like-spaced phase conditions where $N\theta=360°$ and N is an integer of the group 3 or 5, and $\theta$ is the phase condition increment, selecting for transmission one said phase condition at each instant, shifting the selected phase conditions by the increment $\theta$ to transmit a signal of one kind, and shifting the selected phase condition by an increment $n\theta$, where $n$ is an integer less than N, to transmit a signal of a second kind, 14. A method of operating a transmitter to convey information in the form of selected increments of phase change of a constant frequency signal comprising generating a wave of said frequency, presenting said wave at N terminals in N discretely phased portions respectively separated by multiples of $\theta$ where $N\theta=360°$, and N is an integer larger than 2, developing a group of $N-1$ information signals each representing binary information to be transmitted, matrix gating said signals at N gates in stepwise rotative order to produce N mutually exclusive gate pulses, applying each of said gate pulses when produced, respectively, to an associated one of said N terminals to pass thereto one of said discretely phased portions of said wave, and applying said information signals, respectively, each in control of one said rotative order in accordance with one of $N-1$ differing phase shifts between said N phases.

15. The method of transmitting binary information coded as magnitudes of phase shift of a wave comprising generating a single frequency wave, modifying said wave to produce at least three output voltages each a differently phased replica of said wave mutually separated by like phase increments, producing in succession a first signal representative of one information bit and a second signal representative of a different information bit, applying said first signal to shift transmission from an instant one of said output voltages to another differing therefrom only by a single said phase increment, and applying said second signal to shift transmission from an instant one of said output voltages to another differing therefrom by at least two said phase increments.

16. The method of demodulation of a wave transmitted according to claim 15 comprising the steps of detecting the instantaneously received phase of said wave with respect to the previously received phase thereof, determining the magnitude of each change of received phase relative to the previously received phase, in terms of single increments and multiples thereof, and indicating received information as separate signals, respectively, for said single and multiple increments.

17. Apparatus for communicating information which comprises means for generating a single frequency wave, means for modifying said wave to produce at least three output variants each a differently phased portion of said wave and each separated by a like phase increment from other said positions, means for producing a first signal representative of one information bit and a second signal representative of a different information bit, means for applying a said first signal to shift control of wave transmission from one to another said variant differing therefrom only by a single said phase increment, means for applying a said second signal to shift control of transmission from one to another said variant differing therefrom by at least two said phase increments, means for receiving said wave, means for detecting the instantly received phase of said wave with respect to an arbitrarily indicated phase thereof, means for determining the magnitude of each phase change detected in terms of multiples of said increment and means for indicating the existance of said first and second signals as single and multiple increments, respectively.

References Cited in the file of this patent

UNITED STATES PATENTS

| | | |
|---|---|---|
| 2,512,152 | Haworth | June 20, 1950 |
| 2,870,431 | Babcock | Jan. 20, 1959 |
| 2,977,417 | Doelz | Mar. 28, 1961 |